United States Patent Office 2,724,203
Patented Nov. 22, 1955

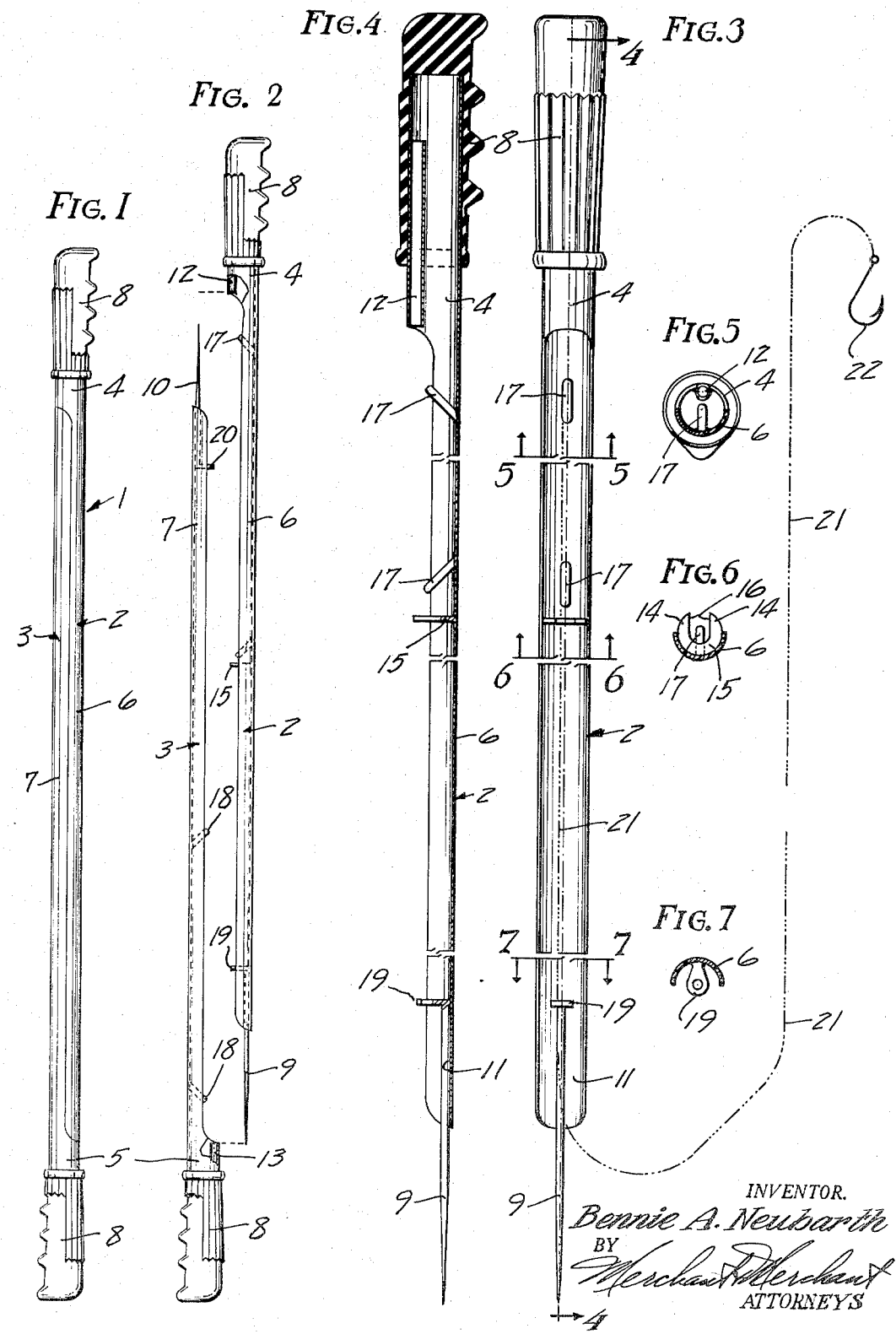

2,724,203

MULTIPLE FISH STICK

Bennie A. Neubarth, Winthrop, Minn., assignor of one-third to John E. Flygare, Lafayette, Minn.

Application March 9, 1955, Serial No. 493,132

5 Claims. (Cl. 43—18)

My invention relates generally to ice fishing apparatus and, more particularly, to ice fishing sticks or poles.

Conventional ice fishing sticks or poles are normally provided with an extremely pointed spear or spike on one end, a handle on the other, and means for coiling a hook-equipped fishline thereon. It is well known that such devices are extremely clumsy, if not dangerous, to transport and store, not only because of the extremely sharp anchoring spear or spike, but also because of the fishhook.

The primary object of my invention is the provision of matching fish sticks formed from tubular stock and including a cylindrical handle forming portion at one end, a relatively long opposite end portion formed from matching semi-cylindrical portions—which portions may be slidably arranged, for purposes of transportation and storage, to form a closed cylindrical body.

A still further object of my invention is the provision of a device of the class immediately above described within the tubular interior of which not only the anchoring spikes but also the fishline and fishhooks are completely concealed.

A still further object of my invention is the provision of a device of the class described which is relatively inexpensive to produce, which is relatively light in weight, which is extremely rugged and durable, and which is as efficient in use as any structure of this type heretofore produced.

The above and still further objects of my invention will become apparent from the following detailed specification, appended claims, and attached drawings:

Referring to the drawings, wherein like characters are indicated by like parts throughout the several views:

Fig. 1 is a view in side elevation of my novel structure with the several parts thereof placed in position for storage and transportation;

Fig. 2 is a view corresponding to Fig. 1 but illustrating my novel structure separated into two independent substantially matching fish sticks or poles;

Fig. 3 is an enlarged view in top plan of the uppermost fish stick of Fig. 2;

Fig. 4 is a view in axial section taken substantially on the line 4—4 of Fig. 3;

Fig. 5 is a transverse section taken on the line 5—5 of Fig. 4;

Fig. 6 is a transverse section taken on the line 6—6 of Fig. 4; and

Fig. 7 is a view in transverse section taken substantially on the line 7—7 of Fig. 4.

Referring with greater particularity to the drawings, the numeral 1 indicates in its entirety a generally cylindrical elongated body formed from tubular stock. Body 1 is formed from a pair of substantially matching fish stick forming body members 2 and 3. Body members 2 and 3 comprise relatively short cylindrical outer end portions 4 and 5, respectively, and relatively long complementary semicircular and cross-sectionally U-shaped inner end portions 6 and 7, respectively. Preferably and as shown, the tubular outer end portions 4 and 5 are provided with conventional rubber hand grips 8. Anchoring spikes 9 and 10, respectively, are secured to the extreme inner ends of the semicircular portions 6 and 7 and project axially outwardly thereof intermediate their opposite side edges.

As shown, the anchoring spikes 9 and 10 are secured to the internal surfaces 11 of the body members 2 and 3 so as to be completely housed within the body 1 when the body members 2 and 3 are in the position of Fig. 1. Tubular guide members 12 and 13, respectively, are secured to the interior surfaces 11 of the body forming members 2 and 3 within the cylindrical outer end portions 4 and 5, respectively. Guide members 12 and 13 are so positioned as to snugly slidably receive therein the pointed spikes 10 and 9, respectively, of the body forming members 3 and 2 when the body forming members 2 and 3 are moved respectively from the position of Fig. 2 to that of Fig. 1. As an aid to such movement and as particularly shown by Fig. 2, the spike 9 is shorter than the spike 10. This arrangement permits insertion of the spike 9 within the apertured guide member 13 immediately prior to the entrance of the spike 10 in the guide member 12. As a further aid to aligning of the members so as to place them in the position of Fig. 1 for transportation and storage, the semi-cylindrical end portion of one of the body forming members 2 and 3 (shown as being the semi-cylindrical portion 6 of body forming member 2), is provided with a pair of transversely extending laterally spaced centering elements 14 adapted to engage the interior surface 11 of the body forming member 3. As shown in Fig. 6 the centering elements 14 are in the nature of segments of an arcuate washer 15 which is provided with a radially outwardly opening slot 16 for a purpose which will hereinafter become apparent.

Also preferably and as shown, each of the semi-cylindrical portions 6 and 7 of the body forming members 2 and 3, respectively, is provided with cleat forming fingers 17 and 18, respectively, which are secured to the internal surfaces 11 thereof and project radially inwardly thereof in opposite directions. It will be noted that the cleat forming fingers 17 and 18 are located relatively close to the tubular end portions 4 and 5, respectively, so as to be staggered for purposes of positioning the body members as in Fig. 1.

Also preferably and as shown, each of the semi-circular portions 6 and 7 of the body forming members 2 and 3 is provided with a fish line receiving eye 19 and 20, respectively. Eyes 19 and 20 are welded or otherwise rigidly secured to the internal surface 11 and intersect the axis of the body 1. Eyes 19 and 20 being located adjacent the open inner ends of the body forming members 2 and 3, respectively, are obviously so staggered as to permit longitudinal sliding movements of said members for purposes of securing them together as shown in Fig. 1, or detaching them as shown in Fig. 2.

In practice, a fish line 21 is wrapped about the cleat forming fingers 17 and 18 and the hook 22 may be inserted into the tubular handle forming end portions 4 and 5, respectively, when the body forming members 2 and 3 are placed in the position of Fig. 1 for storage and transportation. When it is desired to separate the body forming members 2 and 3, whereby to provide two undependent fish sticks or poles, it is but necessary to exert force upon the handles 8 in opposite directions. Thereafter the hooks are removed from the tubular handles 4 and 5 (or wherever they have been positioned during such storage), and the line 21 unwound sufficiently from the cleat forming fingers 17 and 18. Note that said line extends through the aperture 16 in the centering washer 15 and through the eyes 19 and 20, respectively.

My novel device has been thoroughly tested and found to be completely satisfactory for the accomplishment of the above objects, and while I have disclosed a preferred embodiment thereof, it should be obvious that same is capable of modification without departure from the scope of the appended claims.

What I claim is:

1. In a device of the class described, a generally cylindrical elongated tubular body, said body being formed from a pair of substantially matching fish stick forming open-ended body members, each of said members comprising a relatively short handle forming cylindrical end portion and a relatively long semi-cylindrical cross-sectionally U-shaped end portion, a relatively narrow pointed anchoring spike secured to the internal surfaces of said body members intermediate their opposite longitudinal side edges and projecting axially outwardly from the open ends thereof, and apertured guide members secured to the internal surfaces of the cylindrical handle forming end portion of each of said body members, said guide members snugly slidably receiving the anchoring spike of the other of said body members.

2. The structure defined in claim 1 in which the relationship between said anchoring spikes and their cooperating guide members is such that one of said spikes will be slidably received in its cooperating guide member prior to the other of said anchoring spikes being received in its guide member.

3. The structure defined in claim 1 in which the semispherical end portions of one of said body members is provided with a pair of diametrically extending laterally spaced centering elements adapted to engage the interior surface of the opposite body forming member intermediate its ends.

4. The structure defined in claim 3 in which the interior surface of each of said body forming members is provided with a fishline receiving eye which intersects the axis of said body, the fishline receiving eye of one of said body members being staggered with respect to the other thereof.

5. The structure defined in claim 1 in which the semi-cylindrical portion of each of said body members is provided adjacent its relatively short handle forming cylindrical end portions with a pair of cleat forming fingers which project substantially radially inwardly therefrom in opposite directions.

References Cited in the file of this patent

UNITED STATES PATENTS

| | | |
|---|---|---|
| 2,362,835 | Lauer | Nov. 14, 1944 |
| 2,436,531 | Shipley | Feb. 24, 1948 |
| 2,546,079 | Seviola | Mar. 20, 1951 |

FOREIGN PATENTS

| | | |
|---|---|---|
| 1,062,812 | France | Apr. 27, 1954 |